UNITED STATES PATENT OFFICE.

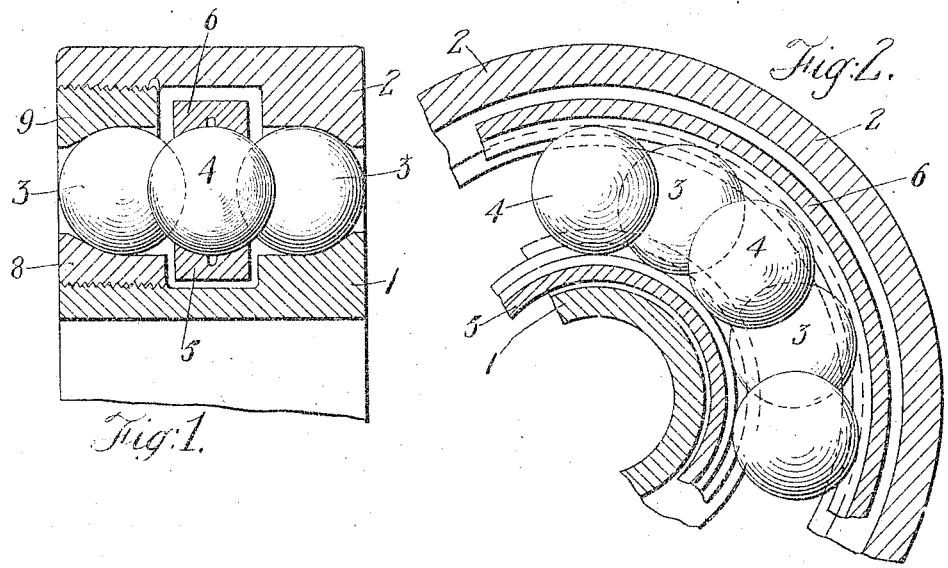

CARL P. ASTROM, OF EAST ORANGE, NEW JERSEY.

BALL-BEARING.

1,283,449.
Specification of Letters Patent.
Patented Nov. 5, 1918.

Application filed June 14, 1918. Serial No. 239,965.

*To all whom it may concern:*

Be it known that I, CARL P. ASTROM, a citizen of the United States, and a resident of East Orange, in the county of Essex and State of New Jersey, have invented certain new and useful Improvements in Ball-Bearings, of which the following is a specification.

This invention relates to ball bearings and has particular reference to improvements in ball retaining means whereby the friction and wear incident to ordinary ball spacing cages as now constructed may be eliminated.

The invention is of especial applicability to annular ball bearings for aeroplanes and other high speed machines, but it will be understood that the invention is applicable to all instances where ball bearings are at present used, and wherein it is desirable to have as near a frictionless bearing as possible.

The invention is shown in accompanying drawing, wherein—

Figure 1 is a section of a ball bearing embodying the invention wherein the load balls and the spacing balls are of the same size.

Fig. 2 is a side view.

Referring to Figs. 1 and 2, 1 is the inner race, 2 the outer race, carrying two rows of load balls 3 with spacing balls 4 of the same diameter between, there being one spacing ball for each two load balls. The spacing balls are held by an inner retaining ring 5 and an outer retaining ring 6, and roll on said rings upon the same axis as the load balls roll on the races, it being observed that the rings 5, 6 are carried by the balls 4 and rotate freely in the opposite direction. The bearing is assembled by inserting the screw races 8, 9, holding the parts assembled in a complete unit.

The spacing balls all rotate oppositely but parallel to the load balls, and the spacing rings rotate oppositely to the spacing balls, every contact being a rolling contact and points in contact always rolling at the same surface speed.

What is claimed, is:

A bearing embodying a plurality of rows of load carrying balls, spacing balls between said load carrying balls, and external and internal independently operating retaining rings coöperating with said spacing balls to hold said spacing balls in position.

Signed at New York city, in the county of New York and State of New York, this 12th day of June, A. D. 1918.

CARL P. ASTROM.

Witness:
    IDA M. FITZPATRICK.